(12) United States Patent
Koide

(10) Patent No.: US 9,377,772 B2
(45) Date of Patent: Jun. 28, 2016

(54) NUMERICAL CONTROLLER INCLUDING CORNER MULTIPLE CURVES INSERTING UNIT

(71) Applicant: FANUC Corporation, Minamitsuru-gun, Yamanashi (JP)

(72) Inventor: Naoya Koide, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 539 days.

(21) Appl. No.: 13/943,934

(22) Filed: Jul. 17, 2013

(65) Prior Publication Data

US 2014/0025194 A1 Jan. 23, 2014

(30) Foreign Application Priority Data

Jul. 19, 2012 (JP) .................................. 2012-160473

(51) Int. Cl.
*G06F 19/00* (2011.01)
*G05B 19/18* (2006.01)
*G05B 19/4093* (2006.01)

(52) U.S. Cl.
CPC ........ *G05B 19/182* (2013.01); *G05B 19/40937* (2013.01); *G05B 2219/34175* (2013.01); *G05B 2219/36215* (2013.01); *Y02P 90/265* (2015.11)

(58) Field of Classification Search
CPC .......... G05B 19/182; G05B 19/40937; G05B 2219/34175; G05B 2219/36215; Y02P 90/265
USPC ........................................................ 700/187
See application file for complete search history.

(56) References Cited

U.S. PATENT DOCUMENTS

| 4,959,597 | A | * | 9/1990 | Kawamura | ......... G05B 19/4103 318/568.15 |
| 5,043,644 | A | * | 8/1991 | Sasaki | ................ G05B 19/4068 318/568.1 |
| 6,922,606 | B1 | * | 7/2005 | Yutkowitz | ............... G05B 19/00 318/560 |
| 8,024,068 | B2 | * | 9/2011 | Gray | ...................... B25J 9/1602 382/153 |
| 2002/0084763 | A1 | * | 7/2002 | Shibukawa | ...... G05B 19/40937 318/569 |
| 2011/0166693 | A1 | | 7/2011 | Nishibashi | |

FOREIGN PATENT DOCUMENTS

| CN | 101470434 A | 7/2009 |
| JP | H07-152417 A | 6/1995 |
| JP | 9-190211 A | 7/1997 |
| JP | H10-055212 A | 2/1998 |
| JP | 10-320026 A | 12/1998 |
| JP | 2008-225825 A | 9/2008 |
| WO | WO-2010-032284 A1 | 3/2010 |

OTHER PUBLICATIONS

Notice of Decision of Rejection mailed Jun. 3, 2006 in Japanese Patent Application No. 2012-160473 with English Translation.

* cited by examiner

*Primary Examiner* — Mohammad Ali
*Assistant Examiner* — Ziaul Karim
(74) *Attorney, Agent, or Firm* — Drinker Biddle & Reath LLP

(57) ABSTRACT

A numerical controller configured to control a machine tool for machining the workpiece on the basis of a machining program composed of a plurality of blocks includes a corner multiple curves inserting unit. This corner multiple curves inserting unit inserts, between consecutive two blocks, three cubic polynomial curves in which a position, a direction and a curvature are continuous and the distances from these two blocks are within a prescribed allowable tolerance, if a direction or a curvature between these two blocks is discontinuous in the machining program.

3 Claims, 6 Drawing Sheets

NUMERICAL CONTROLLER INCLUDING CORNER MULTIPLE CURVES INSERTING UNIT

RELATED APPLICATION DATA

This application claims priority under 35 U.S.C. §119 and/or §365 to Japanese Application No. 2012-160473 filed Jul. 19, 2012, the entire contents is incorporated herein by reference.

BACKGROUND OF THE INVENTION

1. Field of the Invention

The present invention relates to a numerical controller capable of setting an allowable amount of inward rounding at a corner arising between blocks. More specifically, the present invention relates to a numerical controller having the function to insert, between the two blocks forming the corner, a plurality of cubic or higher-order polynomial curves continuous in position, direction and curvature and no larger in inward rounding than a preset allowable amount of inward rounding.

2. Description of the Related Art

In numerical control for controlling a machine tool, a corner is formed in a machining path as the result of a change in the direction of movement, when blocks commanding machining are executed continuously. Shock is liable to occur in the machine tool since the velocity of each axis, including a moving axis, suddenly changes at the corner.

In general numerical control, acceleration and deceleration is performed in order to suppress such shock. Examples of acceleration and deceleration methods include pre-interpolation acceleration and deceleration in which acceleration and deceleration is performed along a machining path before interpolation processing and post-interpolation acceleration and deceleration in which acceleration and deceleration is performed on each axis after interpolation processing.

In pre-interpolation acceleration and deceleration, a calculation is made of such a corner velocity as to make the amount of velocity change in each axis no larger than a preset allowable velocity difference, in order to suppress a sudden change in the velocity of each axis at the corner. Velocity control is performed in a manner such that a feed rate is decelerated from a position a distance short of the corner in order that the feed rate at the corner agrees with the calculated corner velocity and is then accelerated on and after arrival at the corner.

In post-interpolation acceleration and deceleration, control is performed so as to locally average the velocity of each axis determined by pre-interpolation acceleration and deceleration on the basis of time, i.e., so as to suppress a velocity change in each axis, in order to further suppress shock arising in the machine tool. As a result, acceleration and deceleration is performed in an overlapping manner between blocks, and therefore, the machining path deviates from a commanded machining path, thus causing an inward rounding error.

The amount of inward rounding varies depending on the difference of a rounding angle at the corner, a difference in the moving axis between positions preceding and following the corner, or a time constant representing the characteristics of post-interpolation acceleration and deceleration. Accordingly, in order to keep the amount of inward rounding no larger than a given value, the allowable velocity difference of each axis or the time constant of post-interpolation acceleration and deceleration needs to be adjusted for each machine or each machining program used.

Japanese Patent Application Laid-Open No. 9-190211 discloses a technique to interpolate a curve into a corner in a case where acceleration is discontinuous at the corner and make a velocity and an acceleration continuous at both ends of the inserted curve. Six unknown quantities are required in order to make a position, a velocity and an acceleration continuous at both ends of the curve. In this patent document, this requirement is satisfied by a single quintic curve.

In addition, Japanese Patent Application Laid-Open No. 10-320026 describes an example of inserting a plurality of polynomial curves into a corner. If the curves to be inserted cubic curves, a direction and a curvature can be made continuous at both ends of the curves by inserting four cubic curves.

In the technique disclosed in Japanese Patent Application Laid-Open No. 9-190211 mentioned above, interpolating higher-order curves into the corner tends to complicate a path, resulting in difficulty in control. Complicated curves lead to a large curvature at the corner. This patent document does not specifically describe the way of determining such curves as to make a deviation from an original commanded path to fall within an allowable tolerance.

Three cubic curves will suffice for an original direction and curvature to be continuous. Unfortunately, however, such constraints as to make a deviation fall within the allowable tolerance at the midway point of curves to be inserted are added in Japanese Patent Application Laid-Open No. 10-320026 mentioned above, as a result, creating four cubic curves is needed.

SUMMARY OF THE INVENTION

Hence, an object of the present invention is to provide a numerical controller for controlling a machine tool, wherein the numerical controller is capable of setting the amount of inward rounding at a corner to be no larger than a preset allowable tolerance irrespective of machining shapes and commanded velocities, thereby ensuring machining accuracy with respect to a commanded shape, making a direction and a curvature at the corner continuous, relieving shock on the machine tool at the corner, consequently enabling control independent of post-interpolation acceleration and deceleration, and minimizing deceleration at the corner.

The present invention allows a velocity and an acceleration to be made continuous and a path to be stabilized using a plurality of lower-order curves. In the present invention, curves smaller in error than the allowable tolerance are determined by calculation if a corner is present between consecutive linear blocks or by trial in the case of circular-arc blocks and other curved blocks. In addition, in the present invention, three cubic curves are enough for a direction and a curvature to be continuous if curves to be inserted into a corner are cubic curves. Yet additionally, in the present invention, positions at both ends of a curve are given degrees of freedom to determine such curves as to cause an error in the path to fall within an allowable tolerance. Unknown quantities therefore need not be increased.

The numerical controller according to the present invention is configured to control a machine tool for machining a workpiece on the basis of a machining program composed of a plurality of blocks. This numerical controller includes a corner multiple curves inserting unit for inserting, between consecutive two blocks, three cubic polynomial curves in which a position, a direction and a curvature thereof are continuous and the distances from the two blocks are within a prescribed allowable tolerance, if a direction or a curvature between the two blocks is discontinuous in the machining program.

In a case where blocks preceding and following the corner into which the curves are to be inserted are linear blocks and the linear blocks forming the corner are sufficiently long, both the distance from the vertex of a corner to a starting position of the curves and the distance from the vertex of the corner to an ending position of the curves are defined as the same value d, and both first-derivation vectors at one and the other ends of the curves are defined as the same value |v|, and the angle of the corner is defined as θ, and an allowable tolerance at the corner is defined as l, and then the three cubic polynomial curves may be determined by evaluating d and |v| on the basis of the relationship among θ, d and l previously evaluated so as to reduce a curvature and a curvature change in the three cubic polynomial curves.

In a case where blocks preceding and following the corner into which the curves are to be inserted are linear blocks and the linear blocks forming the corner are not sufficiently long, both the distance from the vertex of a corner to a starting position of the curves and an available maximum distance from the vertex of the corner to an ending position of the curves are defined as the same value $d_1$, and both first-derivation vectors at one and the other ends of the curves are defined as the same value |v|, and the angle of the corner is defined as θ, and then the three cubic polynomial curves may be determined by evaluating |v| on the basis of the relationship between θ and $d_1$ previously evaluated so as to reduce a curvature and a curvature change in the three cubic polynomial curves.

The three cubic polynomial curves may allow the distance from the vertex of the corner to the starting position of the curves, the distance from the vertex of the corner to the ending position of the curves, and first-derivation vectors at both ends of the curves to be evaluated by trial, in a case where at least either one of the blocks preceding and following the corner into which the curves are to be inserted is not a linear block.

If a path of a tool center point on the workpiece is commanded by a machining program in a five-axis machine tool having three linear axes and two rotational axes for controlling tool directions with respect to the workpiece, three cubic polynomial curves may be inserted into the path of the tool center point.

According to the present invention, the amount of inward rounding at a corner can be made no larger than a preset allowable tolerance, irrespective of machining shapes and commanded velocities. As a result, machining accuracy for a commanded shape is ensured. In addition, a direction and a curvature are made continuous at the corner, and therefore, shock on a machine at the corner is relieved. Consequently, control not reliant on post-interpolation acceleration and deceleration is possible, and deceleration at the corner can be minimized. This contributes to shortening a cycle time and simplifying machine adjustments.

BRIEF DESCRIPTION OF THE DRAWINGS

The foregoing and other objects and features of the present invention will become apparent from the following description of embodiments taken in conjunction with the accompanying drawings in which.

DETAILED DESCRIPTION OF THE PREFERRED EMBODIMENTS

[Embodiment 1]

Assuming that each curve is represented by $f_i(t)$ (0≤t≤1) (i=1, 2, 3, ..., k), in a case where k curves are inserted into a corner formed by blocks of a machining program, then the conditions for the respective curves to join with the directions and curvatures thereof being continuous are given by Equations (1) shown below:

$$f_i(1) = f_{i+1}(0),$$

$$\frac{d}{dt}f_i(t)\bigg|_{t=1} = \frac{d}{dt}f_{i+1}(t)\bigg|_{t=0},$$

$$\frac{d^2}{dt^2}f_i(t)\bigg|_{t=1} = \frac{d^2}{dt^2}f_{i+1}(t)\bigg|_{t=0}$$

$$(1 \le i \le k-1)$$

(1)

Assume that the end point of a preceding block is $P_0$ and the start point of a following block is $P_k$. Also assume that the two ends of respective curves to be inserted between these preceding and following blocks are $P_{i-1}$ and $P_i$ (i=1, 2, 3, ..., k). That is, the start and end points of the curves to be inserted between the preceding and following blocks are assumed to be $P_0$ and $P_k$, respectively. In addition, the positions of these points $P_0$ and $P_k$ are assumed to be $p_s$ and $p_e$, and the directions of the points are assumed to be $v_s$ and $v_e$. Yet additionally, the curvatures of these preceding and following blocks are assumed to be $a_s$ and $a_e$. Then, the conditions for the directions and curvatures of the curves to be continuous at the junctions of these preceding and following blocks and the curves to be inserted between these preceding and following blocks are given by Equations (2) shown below:

$$f_i(0) = p_s,$$
$$\left.\frac{d}{dt}f_i(t)\right|_{t=0} = v_s.$$
$$\left.\frac{d^2}{dt^2}f_1(t)\right|_{t=0} = a_s$$
$$f_k(1) = p_e,$$
$$\left.\frac{d}{dt}f_k(t)\right|_{t=1} = v_e.$$
$$\left.\frac{d^2}{dt^2}f_k(t)\right|_{t=1} = a_e$$
(2)

Figure 1:
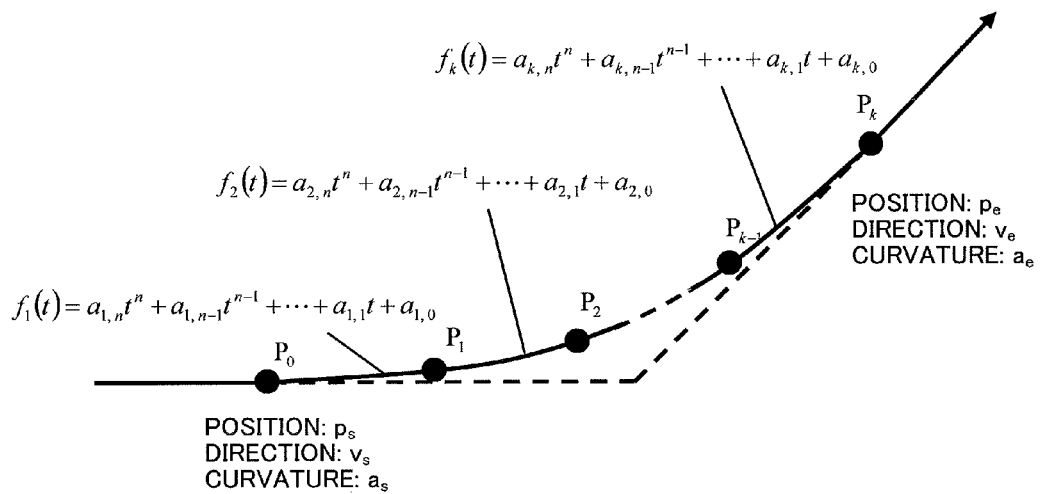
FIG. 1 is a schematic view illustrating an example of inserting k polynomial curves into a corner formed by linear blocks.

FIG. 1 illustrates an example of inserting k polynomial curves into a corner formed by a linear block the end point of which is $P_0$ and a linear block the start point of which is $P_k$. In FIG. 1, $f_1(t)$ to $f_k(t)$ represent the respective curves to be inserted, $P_0, P_1, \ldots P_{k-1}, P_k$ represent the edge points of the respective curves, $p_s$, $v_s$ and $a_s$ represent a position, a direction and a curvature, respectively, at the point $P_0$ (one linear block-side edge point of the first curve $f_1(t)$ to be inserted), and $p_e$, $v_e$ and $a_e$ represent a position, a direction and a curvature, respectively, at the point $P_k$ (one linear block-side edge point of the kth curve $f_k(t)$ to be inserted).

If curves to be inserted are k in number and nth-order polynomial curves, the number of constraint conditions is $3(k+1)$ and the number of unknown quantities is $k(n+1)$. That is, the total number of constraint conditions is $3(k+1)$, i.e., $3(k-1)$ constraint conditions from Equations (1) shown above and representing three constraint conditions and six constraint conditions from Equations (2) shown above and representing six constraint conditions. Thus, as illustrated in FIG. 1, the coefficients of unknown quantities representing the cubic polynomial curves $f_1(t)$ to $f_k(t)$ are $k(n+1)$ in number, i.e., $(a_{1,n}, a_{1,n-1}, \ldots, a_{1,1}, a_{1,0}), (a_{2,n}, a_{2,n-1}, \ldots, a_{2,1}, a_{2,0}), \ldots,$ and $(a_{k,n}, a_{k,n-1}, \ldots, a_{k,1}, a_{k,0})$.

If the unknown quantities are equal to or larger in number than the constraint conditions, there exists at least one curve which satisfies the above-described conditions. Evaluating n and k at which the number of constraint conditions equals the number of unknown quantities results in two cases, i.e., (1) k=1, n=5, and (2) k=3, n=3. Of the two cases, Case (1) is suggested in Japanese Patent Application Laid-Open No. 9-190211. The present invention adopts a case in which the number of constraint conditions and the number of unknown quantities are equalized by setting k=3 when n=3 (i.e., Case (2) mentioned above). Consequently, in the present invention, three (k=3) cubic (n=3) polynomial curves are inserted into a corner. In that case, Equations (1) shown above are given by Equations (3) shown below, and Equations (2) shown above are given by Equations (4) shown below:

$$f_1(1) = f_2(0),$$
$$\left.\frac{d}{dt}f_1(t)\right|_{t=1} = \left.\frac{d}{dt}f_2(t)\right|_{t=0},$$
$$\left.\frac{d^2}{dt^2}f_1(t)\right|_{t=1} = \left.\frac{d^2}{dt^2}f_2(t)\right|_{t=0}$$
$$f_2(1) = f_3(0),$$
$$\left.\frac{d}{dt}f_2(t)\right|_{t=1} = \left.\frac{d}{dt}f_3(t)\right|_{t=0},$$
$$\left.\frac{d^2}{dt^2}f_2(t)\right|_{t=1} = \left.\frac{d^2}{dt^2}f_3(t)\right|_{t=0}$$
(3)

$$f_1(0) = p_s,$$
$$\left.\frac{d}{dt}f_1(t)\right|_{t=0} = v_s.$$
$$\left.\frac{d^2}{dt^2}f_1(t)\right|_{t=0} = a_s$$
$$f_3(1) = p_e,$$
$$\left.\frac{d}{dt}f_3(t)\right|_{t=1} = v_e.$$
$$\left.\frac{d^2}{dt^2}f_3(t)\right|_{t=1} = a_e$$
(4)

The polynomial curves $f_1(t)$, $f_2(t)$ and $f_3(t)$ in that case are given by Equations (5) shown below:

$$f_1(t) = a_{1,3}t^3 + a_{1,2}t^2 + a_{1,1}t + a_{1,0}$$
$$f_2(t) = a_{2,3}t^3 + a_{2,2}t^2 + a_{2,1}t + a_{2,0}$$
$$f_3(t) = a_{3,3}t^3 + a_{3,2}t^2 + a_{3,1}t + a_{3,0}$$
(5)

Here, consider that three cubic polynomial curves are inserted into a corner in a case where both of preceding and following blocks forming the corner into which curves are to be inserted are linear blocks and the linear blocks forming the corner are sufficiently long.

If both the distance from the vertex of the corner (position at which the preceding and following linear blocks intersect with each other) to the starting position of the curves and the distance from the vertex of the corner to the ending position of the curves have the same value d, a deviation e from the commanded path of the curves is made smaller than an allowable tolerance l by adjusting the value of d.

Figure 2:
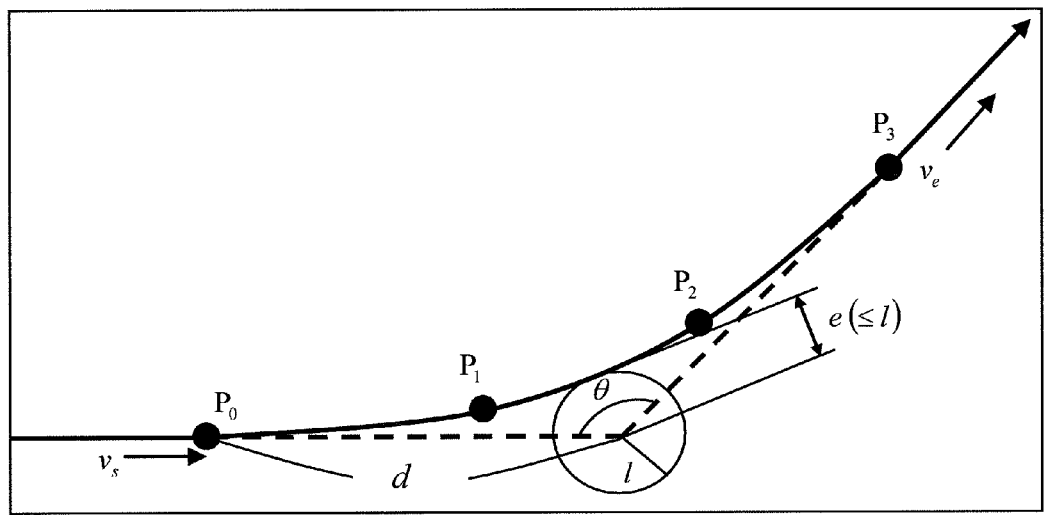
FIG. 2 is a schematic view illustrating a case where n=3 and k=3, and the distance from the vertex of the corner into which the curves are inserted to the starting position of the curves and the distance from the vertex of the corner to the ending position of the curves are equally defined as d in FIG. 1.
Figure 3:
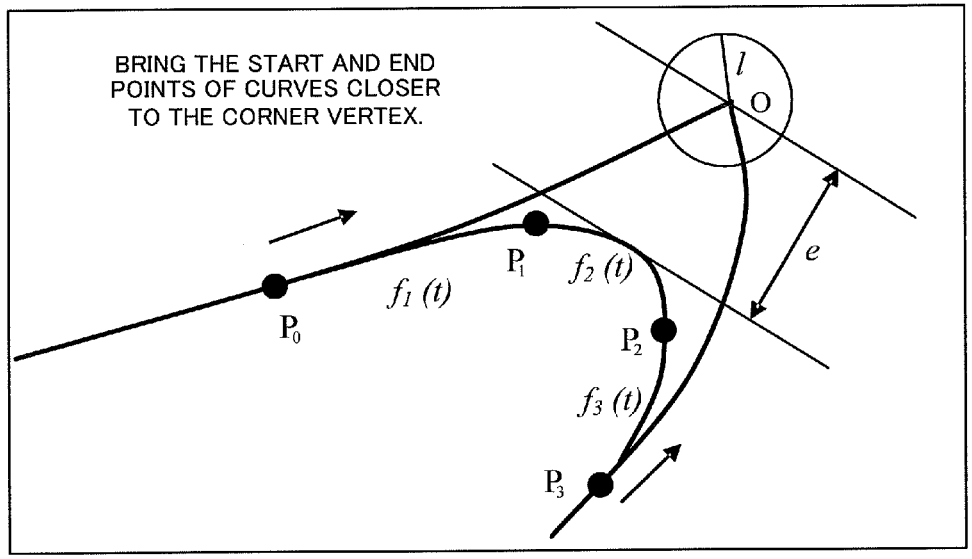
FIG. 3 is a schematic view illustrating an example of inserting three polynomial curves between blocks in a case where the blocks forming a corner are circular-arc blocks or curved blocks, other than linear blocks.

FIG. 2 illustrates a case where n=3 and k=3 in FIG. 1, and both the distance from the vertex of the corner into which the curves are to be inserted to the starting position of the curves and the distance from the vertex of the corner to the ending position of the curves are defined as the same value d.

Simulation has proved that the magnitudes of first-derivation vectors ($v_s$ and $v_e$ in FIG. 1) at both ends of curves to be interpolated between the preceding and following blocks are given by Equation (6) shown below. Here, the magnitudes of both $v_s$ and $v_e$ are defined as the same value $|v|$.

$$|v| = \frac{24}{23}\left(d - \frac{l}{\cos\frac{\theta}{2}}\right)$$
(6)

Simulation has also proved that the corner angle θ and d/l which is a ratio of the distance d from the vertex of the corner to both ends of the curves to the allowable tolerance l, in such curves as to make a curvature and a curvature change at the corner as small as possible, while keeping the path of the curves within an allowable tolerance, have the relationship shown in Table 1 below:

TABLE 1

| θ | d/l |
|---|---|
| 15° | 1.32322 |
| 30° | 1.64481 |
| 45° | 1.98257 |
| 60° | 2.35809 |
| 75° | 2.80097 |
| 90° | 3.35671 |
| 105° | 4.10374 |
| 120° | 5.19551 |
| 135° | 6.98659 |
| 150° | 10.5364 |
| 165° | 21.1354 |

Consequently, given the corner angle θ and the allowable tolerance l, d is determined from Table 1 shown above. By substituting θ, l and d into Equation (6) shown above, it is possible to evaluate the magnitudes of the first-derivation vector |v| at one and the other ends of the curves inserted into the corner. In addition, from the distance d from the vertex of the corner to the starting position (and the ending position) of the curves and the commanded path, it is possible to evaluate the positions $p_s$ and $p_e$ of the point $P_0$ (the end point of the linear block preceding the corner) and the point $P_k$ (start point of the linear block following the corner). Yet additionally, from the |v| and the commanded path, it is possible to evaluate the directions $v_s$ and $v_e$ at the points $P_0$ and $P_k$. Still additionally, since the blocks preceding and following the corner are linear blocks (0 in curvature), $a_s=a_e=0$. From the foregoing, Equations (4) shown above become definite. Then, by solving Equations (3) and (4) as constraint conditions, it is possible to determine the three curves $f_1(t)$, $f_2(t)$ and $f_3(t)$ to be inserted into the corner.

[Embodiment 2]

If blocks preceding and following a corner into which curves are to be inserted are linear blocks and if the linear blocks forming the corner are not sufficiently long, it is not possible to secure the distance d given by Table 1 shown above. Simulation has proved that in that case, such a proportional relationship as shown in Table 2 below exists between $d_l$ and the magnitude |v| of the first-derivation vectors $v_s$ and $v_e$ at both ends of the curves to be inserted between the preceding and following blocks, assuming that the maximum available distance is $d_l$. Accordingly, given the θ and $d_l$, it is possible to evaluate |v|. Subsequent steps are the same as those of Embodiment 1, and therefore, will not be described again here.

TABLE 2

| θ | |v|/$d_l$ |
|---|---|
| 15° | 0.248086 |
| 30° | 0.386692 |
| 45° | 0.473786 |
| 60° | 0.532511 |
| 75° | 0.573899 |
| 90° | 0.603851 |
| 105° | 0.625786 |
| 120° | 0.641793 |
| 135° | 0.653196 |
| 150° | 0.660836 |
| 165° | 0.665231 |

[Embodiment 3]

If at least either one of blocks preceding and following a corner into which curves are to be inserted is not a linear block, that is, if blocks forming the corner are circular-arc blocks or curved blocks, other than linear blocks, the following steps are taken.

(1) Choose arbitrary points as the start point ($P_0$) and end point ($P_k=P_3$) of curves.

(2) Evaluate directions $v_s$ and $v_e$ having a length ($\alpha|P_0-P_3|$) α times the distance between the start point $P_0$ and the end point $2_3$, and also evaluate curvatures $a_s$ and $a_e$. Note that these $v_s$ and $v_e$ are vectors having the directions of $v_s$ and $v_e$ evaluated in Equations (4) and a length of $\alpha|P_0-P_3|$. As a matter of convenience, these directions are represented by the same symbols $v_s$ and $v_e$ as used earlier.

(3) Determine three cubic polynomial curves $f_1(t)$, $f_2(t)$ and $f_3(t)$. (the same method as in Embodiment 1 is used, and therefore, will not be described again here).

(4) Change the value of α mentioned above in several ways to repeat steps (2) and (3) described above, and then evaluate $f_1(t)$, $f_2(t)$ and $f_3(t)$, among the curves thus obtained, which minimize the maximum value of curvatures.

[Embodiment 4]

Figure 4:
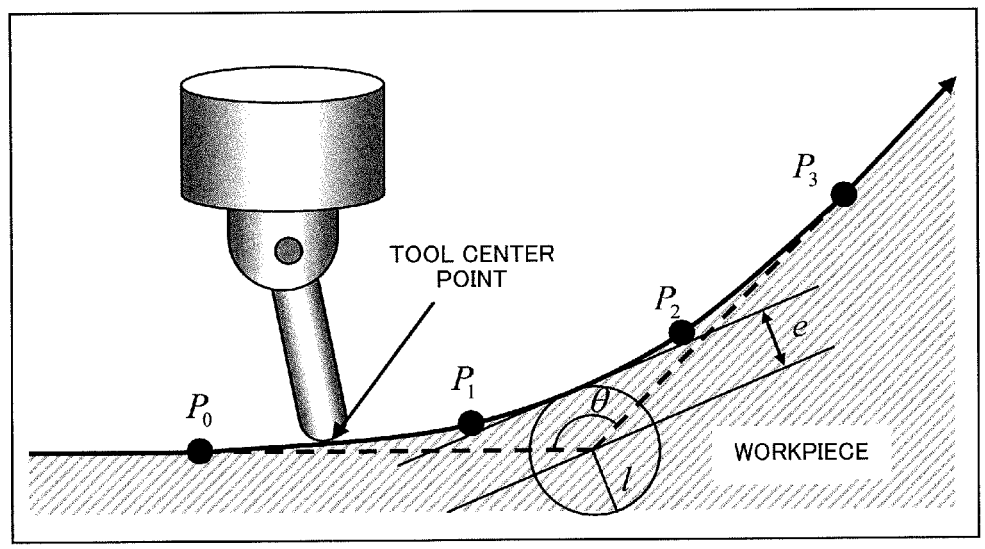
FIG. 4 is a schematic view illustrating the way machining with three cubic polynomial curves inserted is performed in a tool-head-rotating five-axis machine tool.

A five-axis machine tool having two linear axes and two rotational axes for controlling tool directions with respect to a workpiece is available as an example of machine tools. Examples of this five-axis machine tool include a tool-head-rotating five-axis machine tool in which tool heads revolve on two rotational axes, a table-rotating five-axis machine tool in which a table revolves on two rotational axes, and a mixed type five-axis machine tool in which a tool head revolves on one rotational axis and a table revolves on one rotational axis. If the path of a tool center point on a workpiece is commanded by a machining program in a five-axis machine tool, three cubic polynomial curves are inserted, for the path of the tool center point, so that the deviation e of the curves from the commanded path is no larger than an allowable tolerance l. FIG. 4 illustrates the way machining with three cubic polynomial curves inserted is performed in a tool-head-rotating five-axis machine tool.

NUMERICAL EXAMPLE 1

Figure 5:
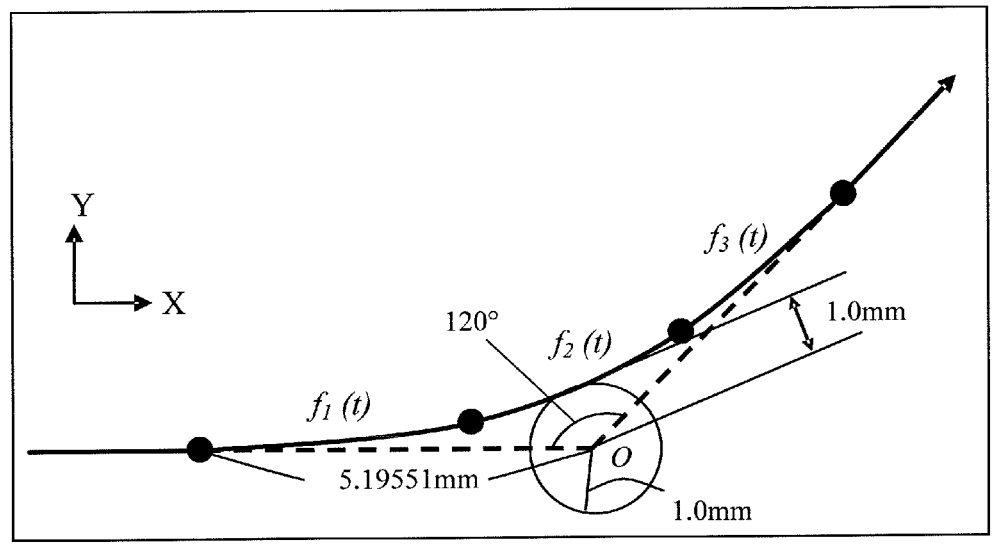
FIG. 5 is a schematic view illustrating an example of inserting three cubic curves between linear blocks lying on a two-dimensional plane.

FIG. 5 illustrates an example of inserting three cubic curves between linear blocks on a two-dimensional plane.

In this numerical example, assume that the angle θ formed by the two linear blocks is 120° and an allowable tolerance l at a corner is 1.0 mm. Also assume that the two linear blocks are sufficiently long.

From Table 1, the distance d from the vertex O of the corner to the start point of the curves to be inserted is 5.19551 mm. In addition, assuming that the vertex of the corner is an original point, and three curves to be inserted are expressed by Equations (7) shown below using X and Y coordinates on the curves corresponding to a parameter t:

$$f_1(t)=(-0.0905t^3+3.33t-5.2, 0.269t^3)$$

$$f_2(t)=(-0.0969t^3-0.271t^2-3.06t-1.95, -0.0560t^3+0.806t^2+0.806t+0.269)$$

$$f_3(t)=(0.187t^3-0.562t^2+2.23t+0.743, -0.213t^3+0.638t^2+2.25t+1.82) \quad (7)$$

where, each curve is defined under the condition of 0≤t≤1.

At this time, the deviation e of the curves from the commanded path is 1.0 (mm).

NUMERICAL EXAMPLE 2

Figure 6:
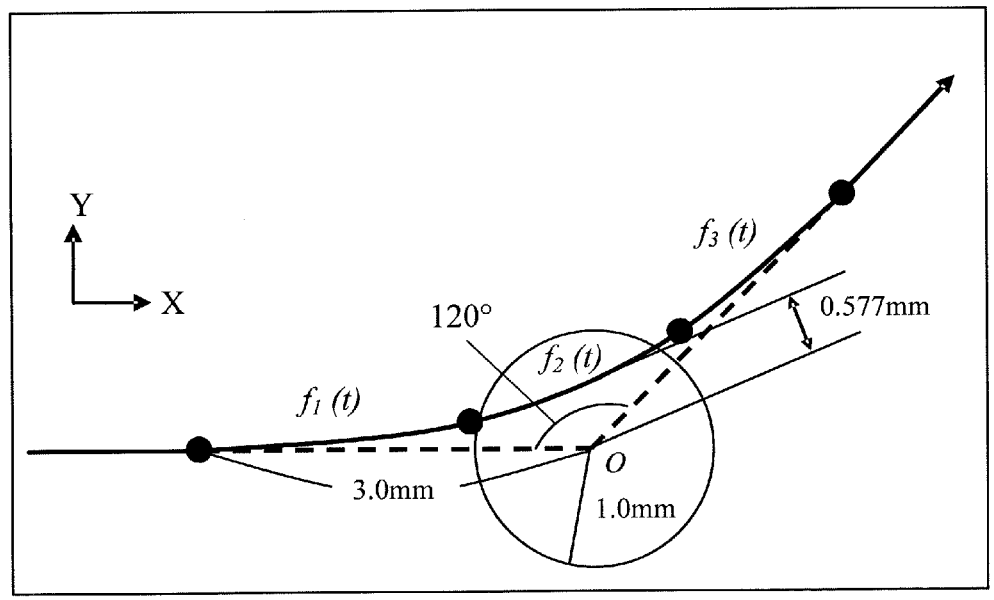
FIG. 6 is a schematic view illustrating an example of inserting curves in a case where the length of at least one of two linear blocks forming a corner is short in Embodiment 1, and therefore, the curves determined in Embodiment 1 cannot be inserted.

FIG. 6 illustrates an example of inserting curves in a case where the length of at least one of the two linear blocks forming the corner is too short to insert the curves determined in Embodiment 1. In this example, the angle formed by the two linear blocks is assumed to be 120° and the allowable tolerance l at the corner is assumed to be 1.0 (mm). In addition, the shorter of the two linear blocks is assumed to be 3.0 (mm) in block length ($d_l$). The distance from the vertex O of the corner to the start point of the curves to be inserted is 3.0 (mm). From Table 2 shown above, the magnitude of a directional vector at both ends of the curves at this time is 3.0× 0.641793=1.925379. Assuming that the vertex of the corner is an original point, the three curves to be inserted are expressed by Equations (8) shown below:

$$f_1(t)=(-0.0522t^3+1.93t-3, 0.155t^3)$$

$$f_2(t)=(-0.0560t^3-0.157t^2+1.77t-1.13, -0.0323t^3+0.465t^2+0.465t+0.155)$$

$$f_3(t)=(0.108t^3-0.325t^2+1.29t+0.429, -0.123t^3+0.368t^2+1.30t+1.05) \quad (8)$$

where, each curve is defined under the condition of $0 \le t \le 1$.

At this time, the deviation e of the curves from the commanded path is 0.577 (mm). The reason for the deviation e being sufficiently small compared with the deviation in Numerical Example 1 described above is that $d_l$ (=3.0) is smaller than d (=5.19551) in Embodiment 1.

NUMERICAL EXAMPLE 3

Figure 7:
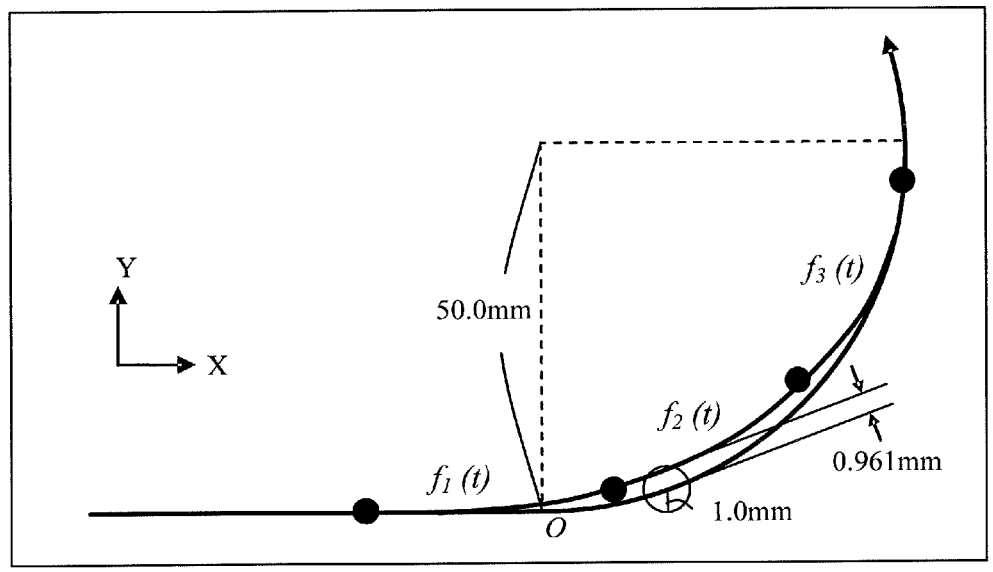
FIG. 7 is a schematic view illustrating an example of inserting three cubic curves into the junction between a linear block and a circular-arc block lying on a two-dimensional plane.

FIG. 7 illustrates an example of inserting three cubic curves into the junction between a linear block and a circular-arc block lying on a two-dimensional plane. In this example, assume that the linear block and the circular-arc block are joined with the directions thereof being continuous. Also assume that the lengths of the linear block and circular-arc block are sufficiently long, the radius of the circular-arc block is 50.0 (mm), and the allowable tolerance 1 at the corner is 1.0 (mm).

Determining such cubic curves as to make the maximum value of curvatures small from the above-described conditions, while adhering to the allowable tolerance, results in Equations (9) shown below:

$$f_1(t)=(-2.99t^3+43.0t-22.0, 4.23t^3)$$

$$f_2(t)=(-0.167t^3-8.97t^2+34.0t+18.0, -4.36t^3+12.7t^2+12.7t+4.23)$$

$$f_3(t)=(1.14t^3-9.47t^2+15.5t+42.8, 0.126t^3-0.377t^2+25.0t+25.3) \quad (9)$$

where, each curve is defined under the condition of $0 \le t \le 1$.

At this time, the distances from the vertex O of the corner to the start and end points of the curves to be inserted are 22.0 mm and 70.7 mm, respectively, and the deviation e of the curves from the commanded path is 0.961 mm.

NUMERICAL EXAMPLE 4

Figure 8:
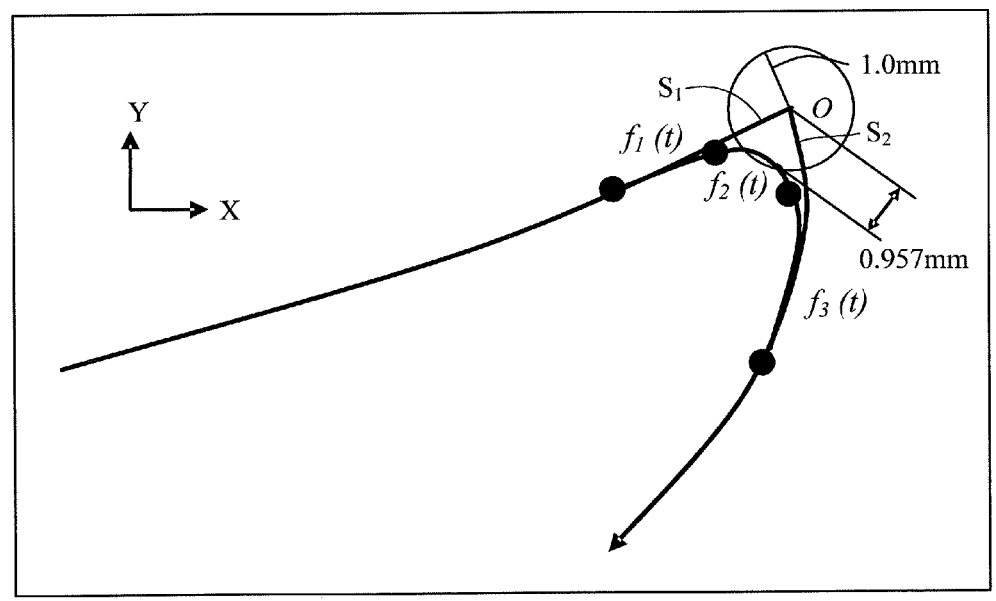
FIG. 8 is a schematic view illustrating an example of inserting three cubic curves between two cubic curved blocks lying on a two-dimensional plane.

FIG. 8 illustrates an example of inserting three cubic curves between two cubic curved blocks lying on a two-dimensional plane. In this example, consider that the curves are inserted into a corner formed by two cubic curves $S_1$ and $S_2$ represented by Expressions (10) shown below:

$$S_1: (10t^3 - 30t^2 + 70t - 50, 5t^3 + 5t^2 - 5t - 5)$$

$$S_2: \left(-5t^3 - 20t^2 + 5t, -\frac{20}{3}t^3 + \frac{10}{3}t^2 - 10t\right) \quad (10)$$

where, each curve is defined under the condition of $0 \le t \le 1$.

In addition, assume that the allowable tolerance 1 at the corner is 1.0 (mm). Determining such cubic curves as to make the maximum value of curvatures small from the above-described conditions, while adhering to the allowable tolerance, results in Equations (11) shown below:

$$f_1(t)=(-0.0748t^3-0.00340t^2+1.74t-2.40, -0.402t^3+0.0361t^2+0.768t-1.13)$$

$$f_2(t)=(0.504t^3+0.228t^2+1.51t-0.737, 0.258t^3-1.171t^2-0.368t-0.728)$$

$$f_3(t)=(0.0558t^3-1.74t^2-0.456t+0.0435, 0.0250t^3-0.398t^2-1.94t-2.01) \quad (11)$$

where, each curve is defined under the condition of $0 \le t \le 1$.

At this time, the distances from the vertex O of the corner to the start and end points of the curves to be inserted are 2.65 (mm) and 4.80 (mm), respectively, and the deviation e of the curves from the commanded path is 0.957 (mm).

NUMERICAL EXAMPLE 5

Figure 9:
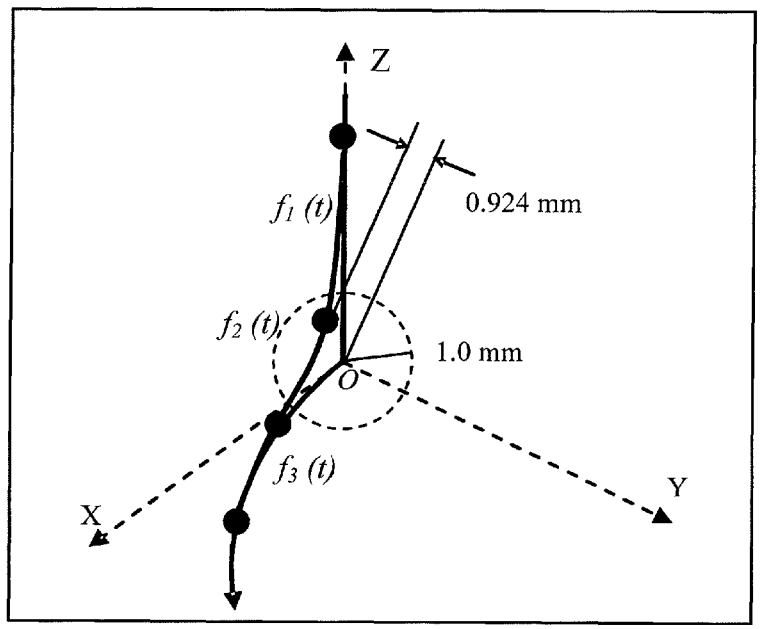
FIG. 9 is a schematic view illustrating an example of joining a linear block and a circular-arc block in a three-dimensional space.

FIG. 9 illustrates an example of joining a linear block and a circular-arc block in a three-dimensional space. In this example, assume that the linear block moves in a Z-axis direction, whereas the circular-arc block moves on an XY plane. Also assume that the lengths of the linear block and circular-arc block are sufficiently long, the radius of the circular-arc block is 50.0 (mm), and the allowable tolerance l at the corner is 1.0 (mm).

Determining such cubic curves as to make the maximum value of curvatures small from the above-described conditions, while adhering to the allowable tolerance, results in Equations (12) shown below:

$$f_1(t) = \begin{pmatrix} 0.195t^3 \\ 0.000127t^3 \\ -0.00204t^3 - 1.29t + 2.6 \end{pmatrix} \quad (12)$$

$$f_2(t) = \begin{pmatrix} -0.0621t^3 + 0.586t^2 + 0.586t + 0.195 \\ 0.0.139t^3 + 0.000380t^2 + 0.000380t + 0.000127 \\ 0.220t^3 - 0.00613t^2 - 1.30t + 1.30 \end{pmatrix}$$

$$f_3(t) = \begin{pmatrix} -0.134t^3 + 0.399t^2 + 1.570t + 1.30 \\ -0.00112t^3 + 0.0421t^2 + 0.0429t + 0.0148 \\ -0.218t^3 + 0.653t^2 - 0.653t + 0.218 \end{pmatrix}$$

where, each curve is defined under the condition of $0 \le t \le 1$.

At this time, the distances from the vertex O of the corner to the start and end points of the curves to be inserted are 2.60 (mm) and 3.14 (mm), respectively, and the deviation e of the curves from the commanded path is 0.924 (mm).

[Functional Block Diagram]

Figure 10:
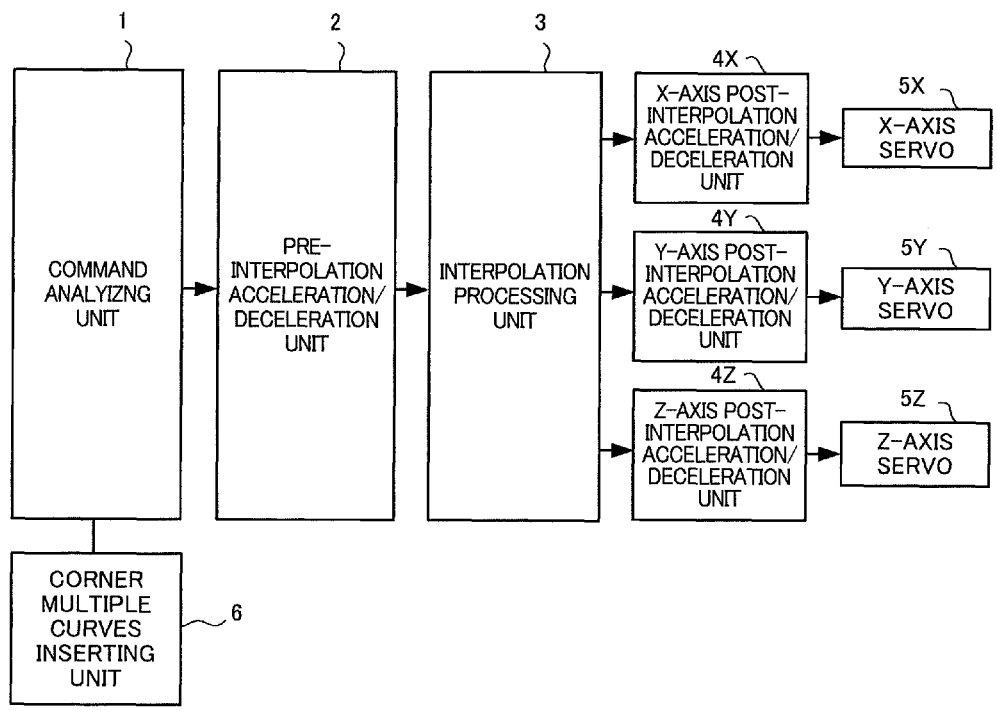
FIG. 10 is a functional block diagram of a numerical controller for illustrating an embodiment of the present invention.

FIG. 10 is a functional block diagram of a numerical controller for illustrating an embodiment of the present invention.

A command analyzing unit 1 analyzes a machining program and converts the program into an executable format. A pre-interpolation acceleration/deceleration unit 2 controls the tangential velocity of a machining path. An interpolation processing unit 3 performs interpolation processing to output a movement command to each axis. Post-interpolation acceleration/deceleration units 4X, 4Y and 4Z for respective axes perform post-interpolation acceleration and deceleration processing in response to movement commands, and drive and control servos 5X, 5Y and 5Z for respective axes based on the processed movement commands for respective axes. Here, a three-axis machine tool is referred to as an example. The numerical controller of the present invention includes a corner multiple curves inserting unit 6 belonging to the command analyzing unit 1 to interpolate curved blocks, so that the direction and curvature of the commanded path of the machining program are continuous.

[Processing Flow at Corner Multiple Curves Inserting Unit]

Figure 11:
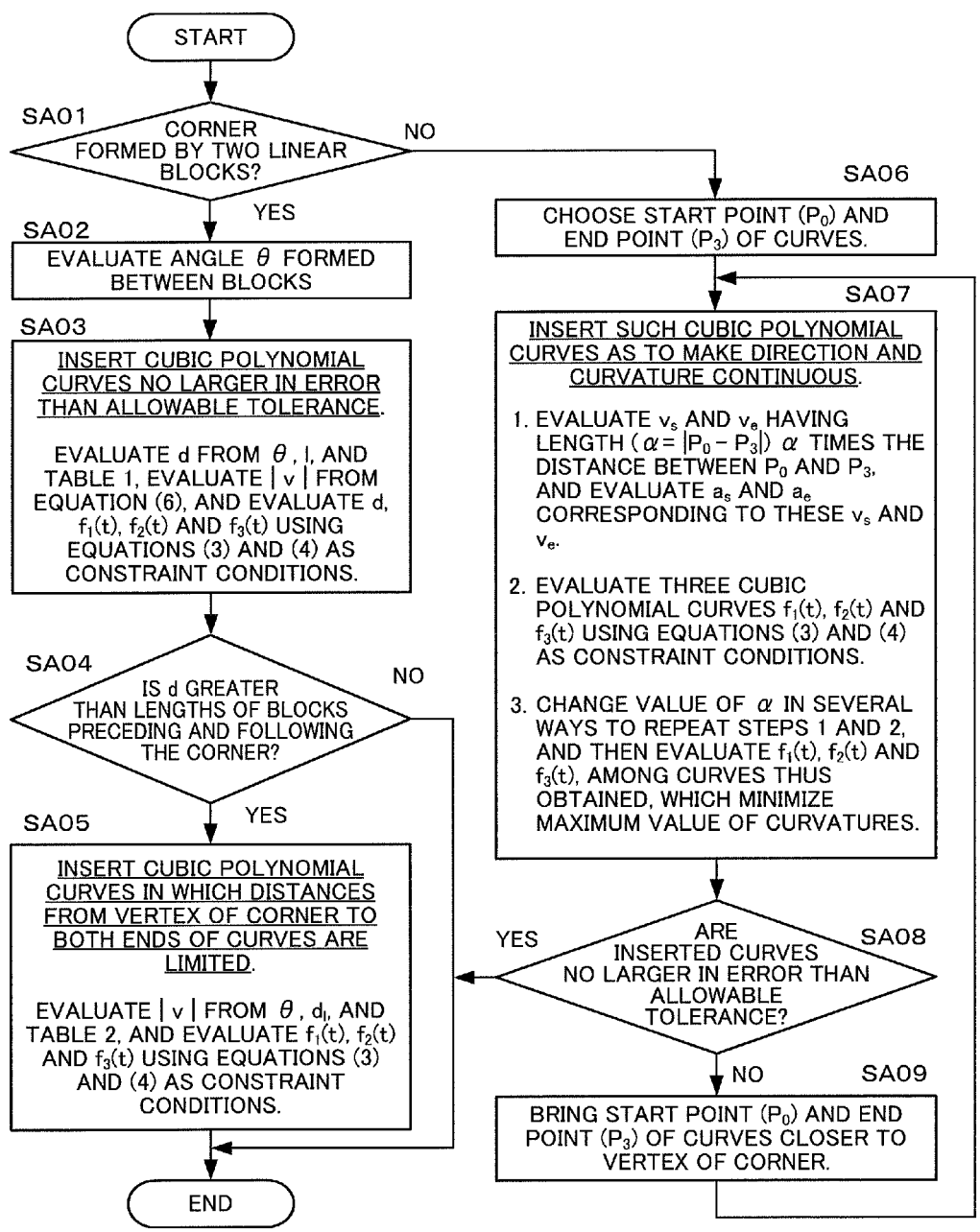
FIG. 11 is a flowchart for describing a processing flow in a corner multiple curves inserting unit.

A processing flow at the corner multiple curves inserting unit executed in the numerical controller illustrated in FIG. 10 will be described using FIG. 11. Hereinafter, a description will be given according to respective steps.

[Step SA01] Whether or not the corner in question is formed by two linear blocks is determined. If the corner is formed by two linear blocks (YES), the process proceeds to Step SA02, but if the corner is not formed by two linear blocks (NO), the process proceeds to Step SA06.

[Step SA02] The angle θ formed between the blocks is evaluated.

[Step SA03] Cubic polynomial curves no larger in error than a given allowable tolerance are inserted. d is evaluated from θ, l, and Table 1, |v| is evaluated from Equation (6), and d, $f_1(t)$, $f_2(t)$ and $f_3(t)$ are evaluated using Equations (3) and (4) as constraint conditions.

[Step SA04] Whether or not d is greater than the lengths of the blocks preceding and following the corner is determined. If d is greater than the lengths of the blocks (YES), the process proceeds to step SA05, but if d is not greater than the lengths of the blocks (NO), the processing is finished.

[Step SA05] Cubic polynomial curves in which the distances from the vertex of the corner to both ends of the curves are limited are inserted. |v| is evaluated from θ, $d_l$, and Table 2, and $f_1(t)$, $f_2(t)$ and $f_3(t)$ are evaluated using Equations (3) and (4) as constraint conditions, and then this processing is finished.

[Step SA06] The start point ($P_0$) and end point ($P_3$) of the curves are chosen.

[Step SA07] Such cubic polynomial curves as to make a direction and a curvature continuous are inserted. Specifically, (1) $v_s$ and $v_e$ having a length ($\alpha|P_0 - P_3|$) α times the distance between $P_0$ and $P_3$ are evaluated and further $a_s$ and $a_e$ corresponding to these $v_s$ and $v_e$ are evaluated.

(2) three cubic polynomial curves $f_1(t)$, $f_2(t)$ and $f_3(t)$ are evaluated.

(3) the value of α is changed in several ways to repeat steps (2) and (3) described above, and then $f_1(t)$, $f_2(t)$ and $f_3(t)$, among the curves thus obtained, which minimize the maximum value of curvatures are evaluated.

Then, the process proceeds to step SA08.

[Step SA08] Whether or not the inserted curves are no larger in error than the allowable tolerance is determined. If the curves are no larger in error than the allowable tolerance (YES), this processing is finished, but if the curves are larger in error than the allowable tolerance (NO), the process proceeds to step SA09.

[Step SA09] The start point ($P_0$) and end point ($P_3$) of the curves are brought closer to the vertex of the corner, and the process returns to step SA07 to continue this processing.

What is claimed is:

1. A numerical controller configured to control a machine tool for machining a workpiece on a basis of a machining program composed of a plurality of blocks, the numerical controller comprising: a processor and a memory, the processor configured to execute:

a corner multiple curves inserting unit which inserts, between consecutive two blocks in the machining program, three cubic polynomial curves in which a position, a direction and a curvature of each one of the three cubic polynomial curves are continuous and distances from the two blocks are within a prescribed allowable tolerance, if the consecutive two blocks are linear blocks and equal to or above a distance d from a vertex of a corner to a starting position of the curves and from the vertex of the corner to an ending position of the curves, wherein, the three cubic polynomial curves to be inserted are determined by evaluating the distance d and a magnitude |v| of first-derivation vectors $v_s$ and $v_e$ at both ends of the curve, from an angle θ of the corner and an allowable tolerance /at the corner, on a basis of a relationship among θ, d, and /which are previously evaluated in the three cubic polynomial curves, wherein a relationship among θ, d, and l are previously evaluated so as to reduce a curvature and a curvature change in the three cubic polynomial curves, and wherein if a path of a tool center point on the workpiece is commanded by a machining program in a five-axis machine tool having three linear axes and two rotational axes for controlling tool directions with respect to the workpiece, three cubic polynomial curves are inserted into the path of the tool center point.

2. A numerical controller configured to control a machine tool for machining a workpiece on a basis of a machining program composed of a plurality of blocks, the numerical controller comprising: a processor and a memory, the processor configured to execute:

a corner multiple curves inserting unit which inserts, between consecutive two blocks in the machining program, three cubic polynomial curves in which a position, a direction and a curvature of each one of the three polynomial curves are continuous and distances from the two blocks are within a prescribed allowable tolerance, if the consecutive two blocks are linear blocks and below a distance d from a vertex of a corner to a starting position of the curves and from the vertex of the corner to an ending position of the curves, wherein, the three cubic polynomial curves to be inserted are determined by evaluating a magnitude |v| of first-derivation vectors $v_s$ and $v_e$ at both ends of the curve, from an angle θ of the corner, on a basis of a relationship between θ and $d_1$ which are previously evaluated so as to reduce a curvature and a curvature change in the three cubic polynomial curves, where $d_1$ is a distance from the vertex of the corner to the starting position of the curves and is an available maximum distance from the vertex of the corner to the ending position of the curves, and wherein if a path of a tool center point on the workpiece is commanded by a machining program in a five-axis machine tool having three linear axes and two rotational axes for controlling tool directions with respect to the workpiece, three cubic polynomial curves are inserted into the path of the tool center point.

3. A numerical controller configured to control a machine tool for machining a workpiece on a basis of a machining program composed of a plurality of blocks, the numerical controller comprising: a processor and a memory, the processor configured to execute:

a corner multiple curves inserting unit which inserts, between consecutive two blocks in the machining program, three cubic polynomial curves in which a position, a direction and a curvature of each one of the three polynomial curves are continuous and distances from the two blocks are within a prescribed allowable tolerance, if a direction or a curvature of the consecutive two blocks is discontinuous and at least either one of the consecutive two blocks is a nonlinear block,
wherein
(1) arbitrary points are chosen as a start point $P_0$ and an end point $P_3$;
(2) directions Vs and Ve each having a length $(\alpha|P_0 - P_3|)$ $\alpha$ times a distance between the start point $P_0$ and the end point $P_3$ are evaluated and curvatures $a_s$ and $a_e$ corresponding to the direction Vs and the direction Ve are evaluated;
(3) three cubic polynomial curves are determined from the start point $P_0$, the end point $P_3$, the direction Vs, the direction Ve, the curvature $a_s$, and the curvature $a_e$;
(4) a value of $\alpha$ is changed in a plurality of ways to repeat the above (2) and (3), and then, among a set of a plurality of three cubic polynomial curves thus obtained, three cubic polynomial curves which minimize a maximum value of curvatures are evaluated as the three cubic polynomial curves to be inserted; and
(5) wherein if a path of a tool center point on the workpiece is commanded by a machining program in a five-axis machine tool having three linear axes and two rotational axes for controlling tool directions with respect to the workpiece, three cubic polynomial curves are inserted into the path of the tool center point.

\* \* \* \* \*